US010625969B2

(12) United States Patent
Shimamura et al.

(10) Patent No.: US 10,625,969 B2
(45) Date of Patent: Apr. 21, 2020

(54) CONVEYING-DIRECTION SWITCHING DEVICE AND SHEET HANDLING DEVICE

(71) Applicant: FUJITSU FRONTECH LIMITED, Inagi (JP)

(72) Inventors: Tatsuya Shimamura, Inagi (JP); Hayato Minamishin, Inagi (JP); Yutaka Namikawa, Inagi (JP); Mitsutaka Nishida, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 16/361,936

(22) Filed: Mar. 22, 2019

(65) Prior Publication Data

US 2019/0218053 A1 Jul. 18, 2019

Related U.S. Application Data

(63) Continuation of application No. PCT/JP2016/078845, filed on Sep. 29, 2016.

(51) Int. Cl.

*B65H 29/58* (2006.01)
*B65G 47/00* (2006.01)
*G07D 9/00* (2006.01)
*B65H 29/70* (2006.01)

(Continued)

(52) U.S. Cl.

CPC ........... *B65H 29/58* (2013.01); *B65H 29/006* (2013.01); *B65H 29/12* (2013.01); *B65H 29/70* (2013.01); *G07D 9/00* (2013.01); *B65H 2301/41912* (2013.01); *B65H 2301/51214* (2013.01); *B65H 2404/63* (2013.01); *B65H 2404/632* (2013.01); *B65H 2701/1912* (2013.01)

(58) Field of Classification Search

None

See application file for complete search history.

(56) References Cited

U.S. PATENT DOCUMENTS

| | | | | |
|---|---|---|---|---|
| 9,573,786 | B2 * | 2/2017 | Moon | B65H 29/58 |
| 2010/0219580 | A1 | 9/2010 | Hamasaki et al. | |

FOREIGN PATENT DOCUMENTS

| | | |
|---|---|---|
| JP | 5-170372 | 7/1993 |
| JP | 2003-54811 | 2/2003 |
| JP | 2006-82947 | 3/2006 |

(Continued)

OTHER PUBLICATIONS

International Search Report dated Dec. 6, 2016 in corresponding International Application No. PCT/JP2016/078845.

(Continued)

*Primary Examiner* — Kavel Siingh

(57) ABSTRACT

A conveying-direction switching device includes: a shaft; and a plurality of blades that are pivotally supported by the shaft and that switch a conveying direction of a sheet conveyed through a conveyance path to a predetermined direction toward a delivering/discharging section for the sheet included in a housing unit that houses the sheet by winding the sheet around a drum together with a belt-like member, wherein the plurality of blades include: a first blade group that is pivotally supported in a neighborhood of a center of the shaft and that is opposed to the delivering/discharging section; and a second blade group that is pivotally supported on an outer side of the shaft as compared with the first blade group.

6 Claims, 13 Drawing Sheets

(51) Int. Cl.
*B65H 29/12* (2006.01)
*B65H 29/00* (2006.01)

(56) References Cited

FOREIGN PATENT DOCUMENTS

| | | | | |
|---|---|---|---|---|
| JP | 2009-107824 | | 5/2009 | |
| JP | 2013-23384 | | 2/2013 | |
| JP | 2014-206607 | | 10/2014 | |
| JP | 2016-31664 | | 3/2016 | |
| WO | WO 2009/034725 | | 3/2009 | |
| WO | WO-2016147151 | A1 * | 9/2016 | ........... B65B 35/243 |

OTHER PUBLICATIONS

Written Opinion of the International Searching Authority dated Dec. 6, 2016 in corresponding International Application No. PCT/JP2016/078845.

* cited by examiner

CONVEYING-DIRECTION SWITCHING DEVICE AND SHEET HANDLING DEVICE

CROSS-REFERENCE TO RELATED APPLICATION

This application is a continuation application of International Application No. PCT/JP2016/078845, filed on Sep. 29, 2016 and designating the U.S., the entire contents of which are incorporated herein by reference.

FIELD

The embodiment(s) discussed herein is (are) related to a conveying-direction switching device and a sheet handling device.

BACKGROUND

Bill handling devices such as ATM (automated teller machine), CD (cash dispenser), or TCR (teller cash recycler), include a temporary housing unit that temporarily houses bills received. It is known that this type of temporary housing unit has a configuration such that a bill is housed by being wound around a drum together with a tape supplied from a reel. After a bill is received by the bill handling device, it is conveyed through a conveying section in the bill handling device, and the conveying direction is switched by a conveying-direction switching gate for the temporary housing unit so that it reaches the temporary housing unit.

The bill handling device includes an intermediate conveyance path for transferring bills from the conveying-direction switching gate to the temporary housing unit. As illustrated in FIG. 11, after a bill is received by the bill handling device, it is conveyed on a conveyance path 7*a*, its direction is switched toward a temporary housing unit 5 by a conveying-direction switching gate 10*x*, and it is housed in the temporary housing unit 5 from a delivering/discharging section 20 via an intermediate conveyance path 9.

As illustrated in FIG. 12, in the temporary housing unit 5, a bill 2 is sandwiched in a vertical direction between tapes 28, 29 that are supplied from reels 14, 15 and guided by pulleys 21 to 23 in the delivering/discharging section 20, and the bill 2 is housed by being wound around a drum 50, which is pivotally supported by the shaft in a rotatable manner, together with the tapes 28, 29. Furthermore, in the temporary housing unit 5, after the bill 2 has been wound around the drum 5D together with the tapes 28, 29, it is discharged from the delivering/discharging section 20 due to inverse rotation of the drum 5D.

Here, when the bill 2 keeps a flat state as illustrated in FIG. 13A while it is sandwiched between the tapes 28, 29 in the delivering/discharging section 20 of the temporary housing unit 5, it is smoothly housed in the temporary housing unit 5 from the conveyance path 7*a* through the delivering/discharging section 20 even if an intermediate conveyance path 9*x* has the shape illustrated in FIG. 14A, and then it is sandwiched between the tapes 28, 29 and is wound around the drum 5D.

However, when the bill 2 is in a state where both ends thereof are turned down as illustrated in FIG. 13B, the shape of the intermediate conveyance path 9*x* illustrated in FIG. 14A causes the turned-down ends to hit the tape 29 or the pulley 22 in front of the delivering/discharging section 20, which result in jams. Therefore, to prevent the occurrence of jams, the intermediate conveyance path 9*x* has the shape illustrated in FIG. 14B so that the attitude of the bill 2 with both ends turned down is corrected by being picked up and guided by the tilted part of the intermediate conveyance path 9*x*.

Patent Document 1: Japanese Laid-open Patent Publication No. 2009-107824

Patent Document 2: Japanese Laid-open Patent Publication No. 2013-023384

Unfortunately, when an intermediate conveyance path is provided in the interval from the conveyance path and the conveying-direction switching gate to the temporary housing unit through the delivering/discharging section to prevent the occurrence of jams by correcting the attitude of a bill, there is a problem of spaces within the chassis of the bill handling device, such that the size of the chassis of the bill handling device is made larger for the space of the intermediate conveyance path, or the size of the temporary housing unit is made smaller to decrease the amount of bills housed (the amount of tape wound around the drum).

SUMMARY

It is an object of the present invention to at least partially solve the problems in the related technology.

According to an aspect of the embodiments, a conveying-direction switching device includes: a shaft; and a plurality of blades that are pivotally supported by the shaft and that switch a conveying direction of a sheet conveyed through a conveyance path to a predetermined direction toward a delivering/discharging section for the sheet included in a housing unit that houses the sheet winding the sheet around a drum together with a belt-like member, wherein the plurality of blades include: a first blade group that is pivotally supported in a neighborhood of a center of the shaft and that is opposed to the delivering/discharging section; and a second blade group that is pivotally supported on an outer side of the shaft as compared with the first blade group, and each blade in the second blade group is formed such that a height in the predetermined direction relative to the conveyance path is shorter as a pivotally supported position is located on an outer side of the shaft.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENT(S)

Figure 1:
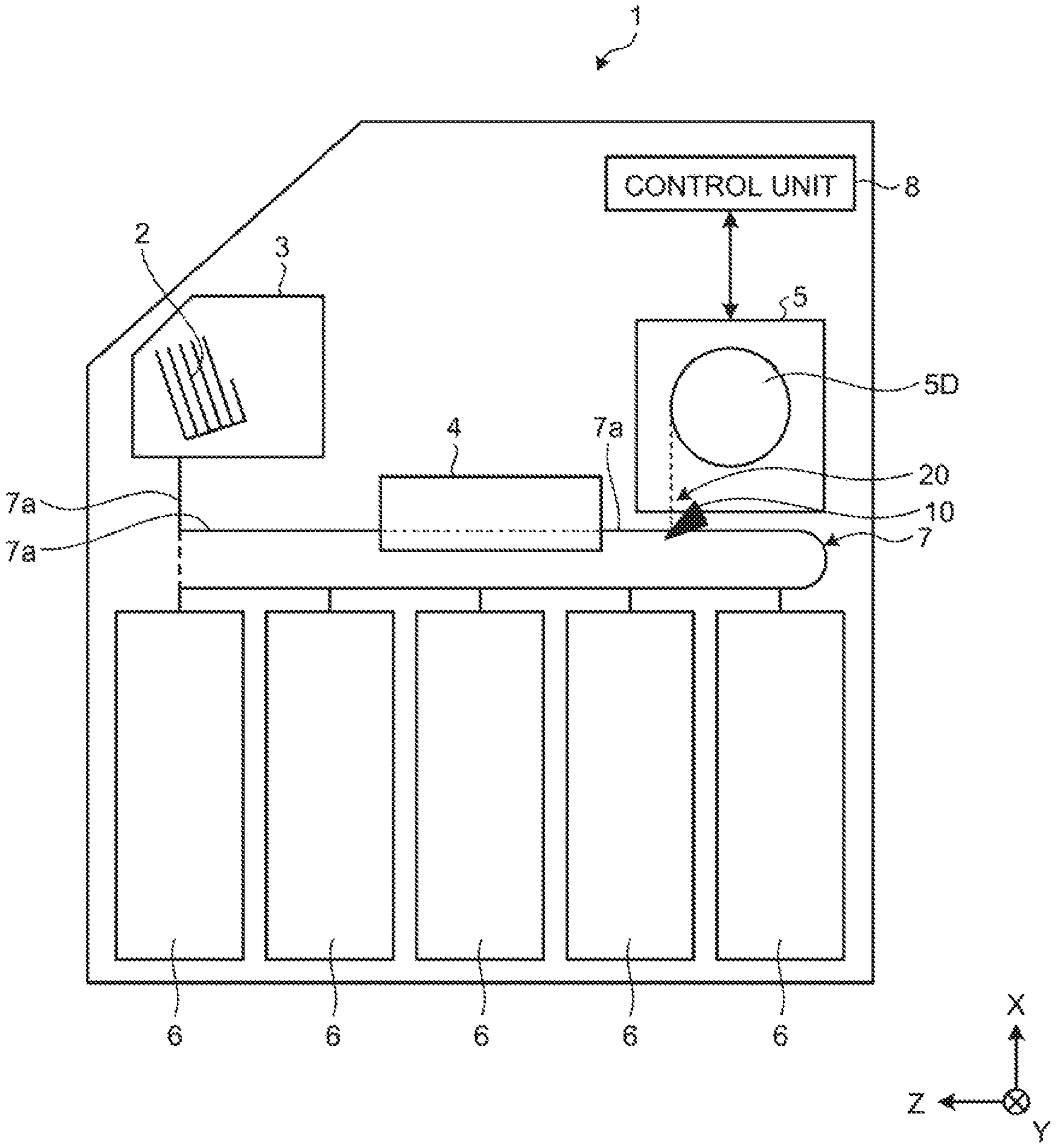
FIG. 1 is a schematic diagram that illustrates an entire bill handling device according to an embodiment.

Preferred embodiments will be explained with reference to accompanying drawings. With reference to the drawings, a detailed explanation is given below of an embodiment of a conveying-direction switching device and a sheet handling device disclosed in the subject application. Here, the conveying-direction switching device and the sheet handling device disclosed in the subject application are not limited to the embodiment below. Furthermore, as for each of components that are explained and illustrated with a reference numeral attached in each drawing, the same one is attached with the same reference numeral. Moreover, explanations are appropriately omitted for components that appear subsequently.

Figure 2:
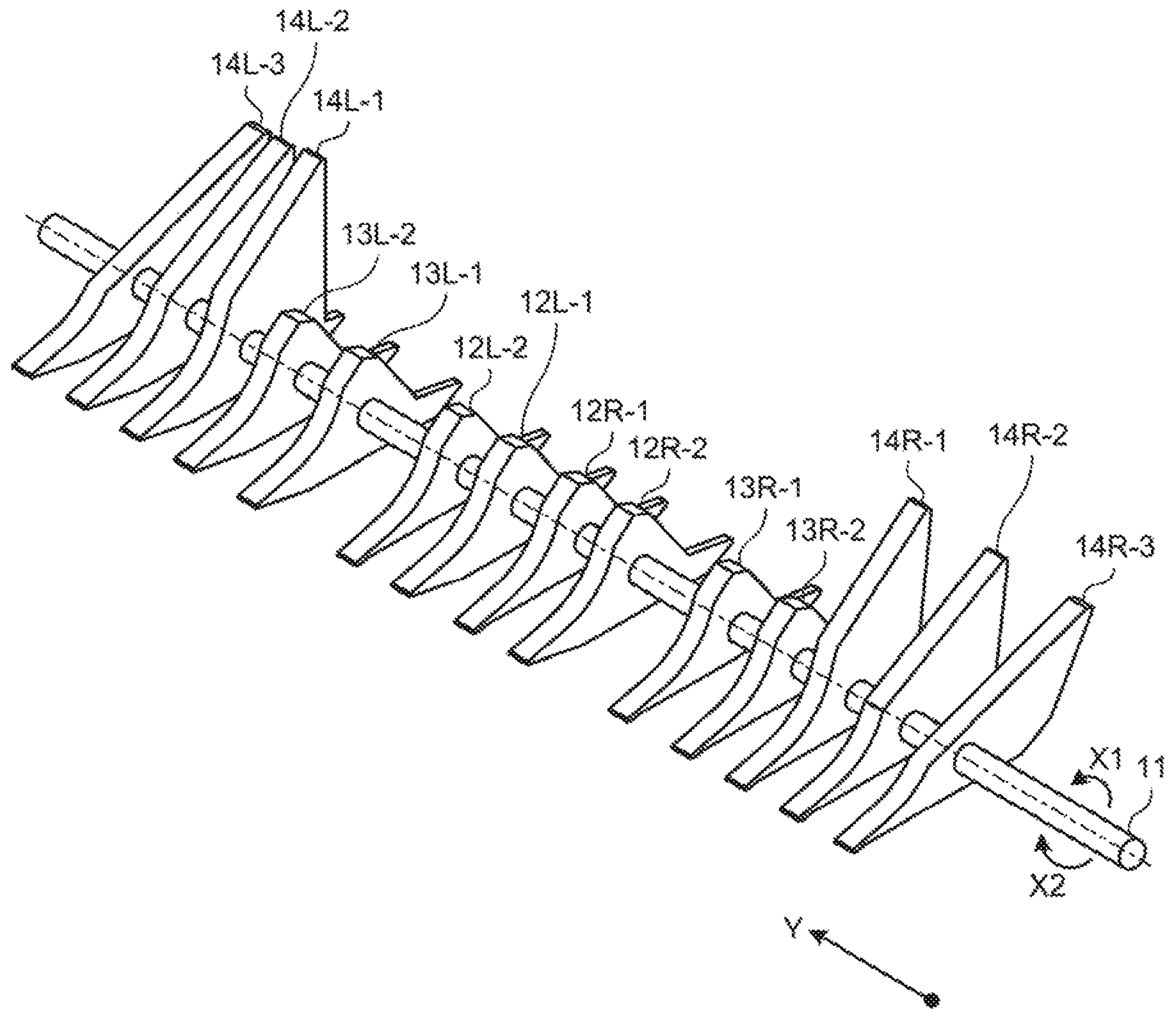
FIG. 2 is a perspective view that illustrates a conveying-direction switching gate according to the embodiment.
Figure 12:
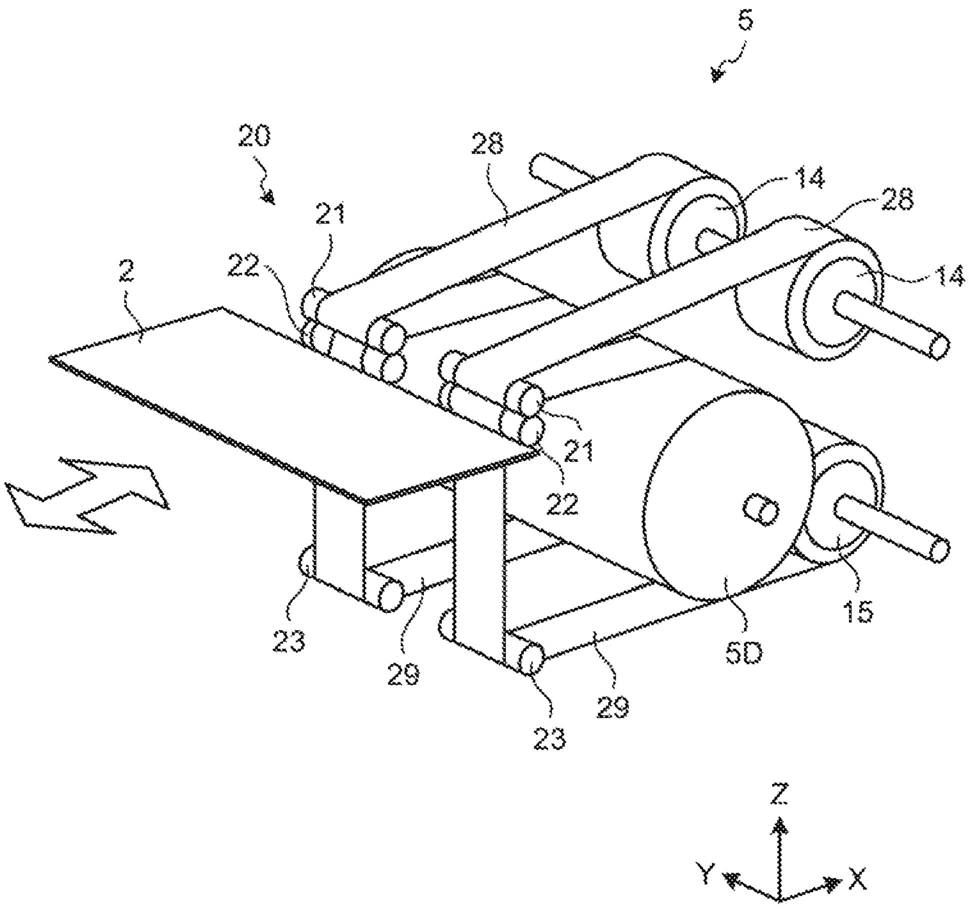
FIG. 12 is a schematic view of a behavior of the bill delivered into or discharged from the temporary housing unit when viewed in an oblique direction.
Figure 13A:
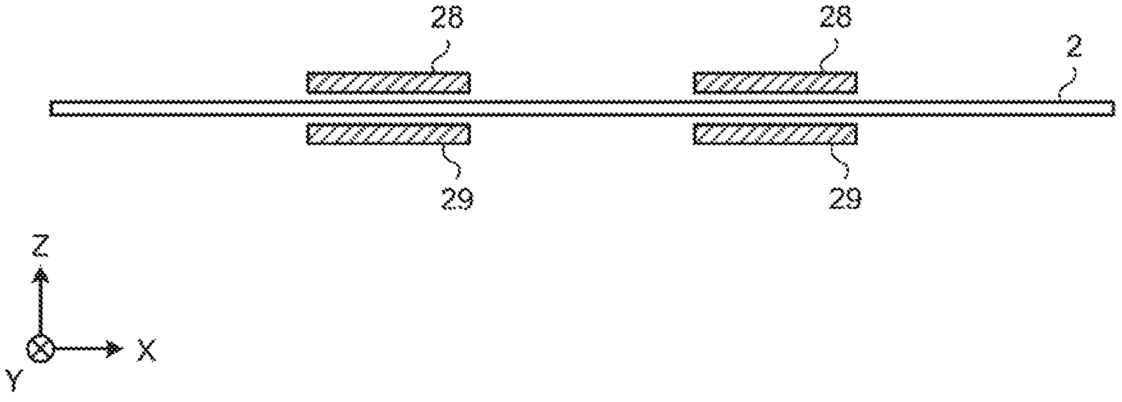
FIGS. 13A and 13B are schematic views that illustrate states of the bill when it is housed in the temporary housing unit.
Figure 13B:
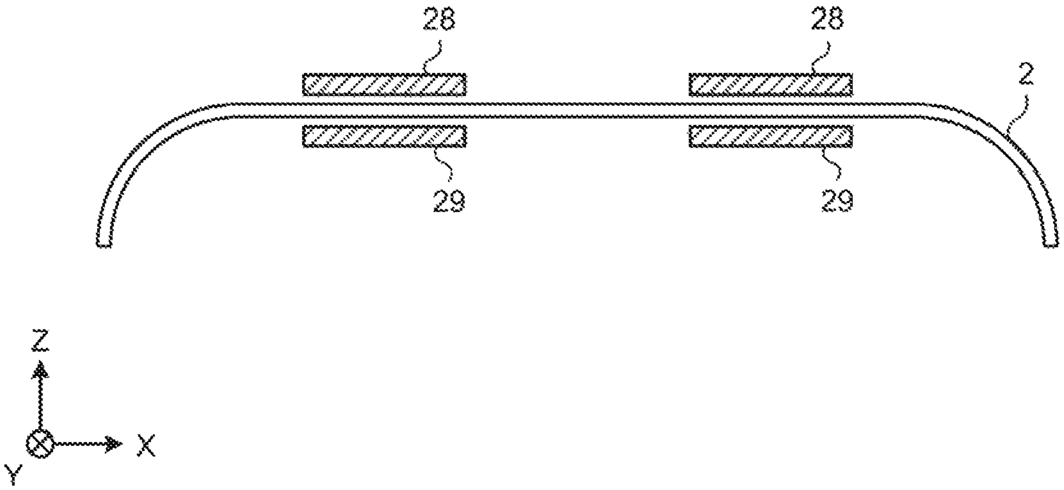
Figure 14A:
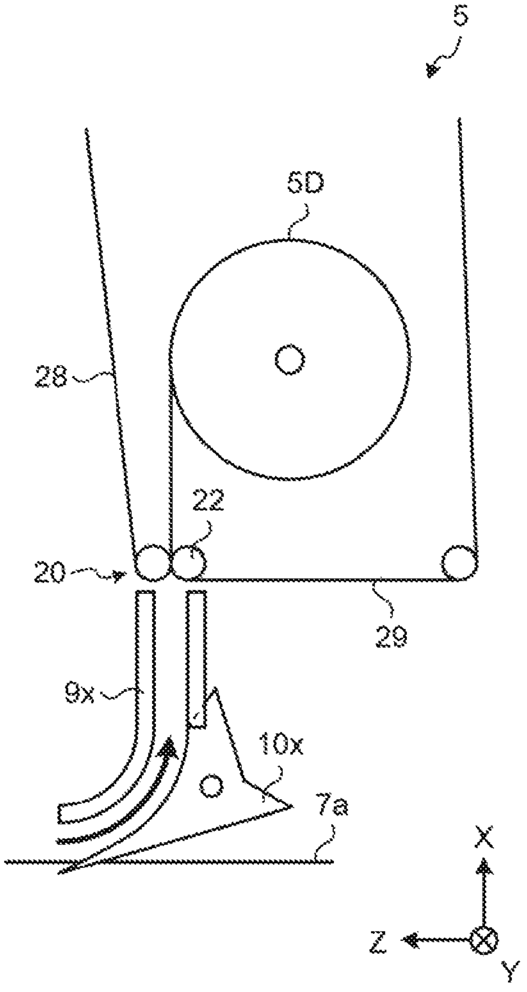
FIGS. 14A and 14B are schematic diagrams that illustrate a jam that occurs when the bill is received by the temporary housing unit and a method for preventing jams according to a related technology.
Figure 14B:
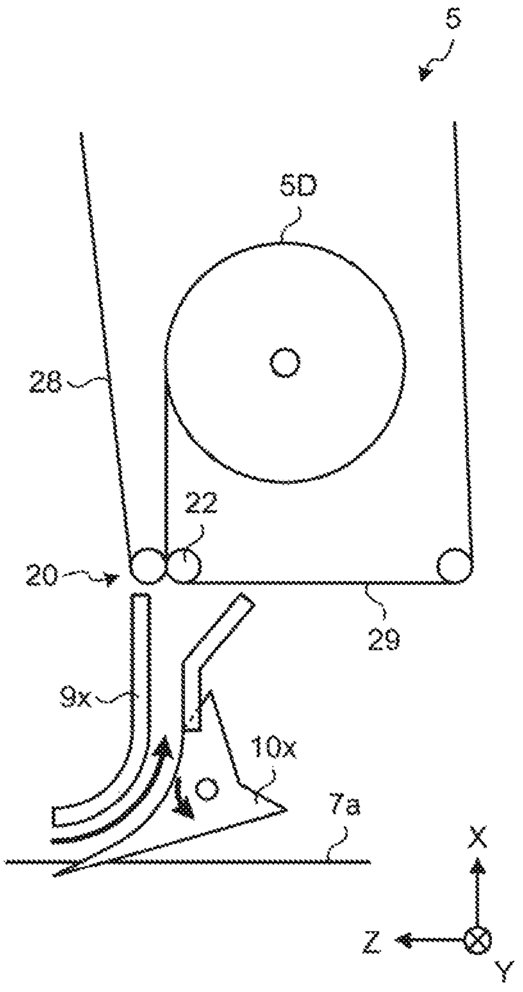

In the XYZ coordinate system used in explanation of the following embodiment, as illustrated in FIG. 1, FIG. 12, and the like, a money receiving/drawing direction of the bill 2 to and from the delivering/discharging section 20 described later is an X-axis direction; a money receiving direction is a positive direction, and a money drawing direction is a negative direction. Furthermore, as illustrated in FIG. 1, FIG. 2, FIG. 12, and the like, the direction along a shaft 11 described later is the Y-axis direction; a direction from a blade 14R-3 to a blade 14L-3 described later is a positive direction, and a direction from the blade 14L-3 to the blade 14R-3 is a negative direction. Furthermore, as illustrated in FIG. 12, and the like, the direction between the reels 14 and 15 in the temporary housing unit 5 described later is the Z-axis direction; the direction from the reel 15 to the reel 14 is a positive direction, and the direction from the reel 14 to the reel 15 is a negative direction. The X, Y, and Z axes are substantially perpendicular to one another.

In the following embodiment, although bills are used as an example of the sheet, bills are not a limitation. Examples of the sheet include drafts, checks, coupons for goods, various securities, valuable certificates such as stock certificates.

Configuration of the Bill Handling Device

FIG. 1 is a schematic diagram that illustrates an entire bill handling device according to the embodiment. As illustrated in FIG. 1, a bill handling device 1 according to the embodiment includes: a money receiving/drawing unit 3 that receives and draws the bill 2; and a determining unit 4 that determines the authenticity of the bill 2, or the like, received by the money receiving/drawing unit 3. The bill handling device 1 further includes: the temporary housing unit 5 that receives the bill 2, conveyed from the determining unit 4, through the delivering/discharging section 20 and winds it around the drum 5D together with a tape, which is an example of a belt-like member, thereby temporarily housing it; and a plurality of storage units 6 that store the bill 2 delivered from the temporary housing unit 5.

The temporary housing unit 5 includes the delivering/discharging section 20 that is provided adjacent to the conveyance path 7*a* described later to delivery and discharge the bill 2 between the conveyance path 7*a* and the temporary housing unit 5. The temporary housing unit 5 has the same configuration as the related one illustrated in FIG. 12, and it includes the drum 5D that is pivotally supported by a shaft in a rotatable manner; the pulleys 21 to 23 which the tapes 28, 29 supplied from the reels 14, 15 are wound around; and the reels 14, 15 that supply the wound tapes 28, 29. Here, the configuration of the temporary housing unit 5 illustrated in FIG. 12 is only an example.

For example, when money is received, the bill handling device 1 feeds the bills 2, received by the money receiving/drawing unit 3, to the conveyance path 7*a* one by one by using a feed mechanism. After determining the authenticity of the fed bill 2 by using the determining unit 4, the bill handling device 1 stores it in the temporary housing unit 5. After all the received bills 2 are stored in the temporary housing unit 5, the bill handling device 1 presents the amount of received money to a payer and, when the payer confirms the amount of received money, feeds the bills 2 from the temporary housing unit 5 and stores them in the storage unit 6. When the payer makes a selection to return the received bills, the bill handling device 1 feeds the bills 2 from the temporary housing unit 5, stores all the bills 2 in the money receiving/drawing unit 3, and returns the bills 2 to the payer. The bill handling device 1 does not convey sheets other than the bills 2, such as receipts, and the bills 2 that are not readable to the temporary housing unit 5 but stores them in the money receiving/drawing unit 3 and returns them to the payer.

Furthermore, for example, when money is to be drawn, the bill handling device 1 feeds, from the storage unit 6, the bills 2 that correspond to the amount of money designated by a person who is to draw money, determines its authenticity by using the determining unit 4, and stores the bills 2 that correspond to the designated amount of money in the money receiving/drawing unit. The bill handling device 1 conveys the bills 2 that are not appropriate to be drawn to a collection storage (not illustrated). The person who is to draw money takes the bills 2 that corresponds to the designated amount of money stored in the money receiving/drawing unit.

The bill handling device 1 further includes: a conveying mechanism 7 that conveys the bills 2; and a conveying-direction switching gate 10 that switches the conveying direction of the bills 2. The conveying mechanism 7 includes the conveyance path 7*a* for conveying the bill 2 through the money receiving/drawing unit 3, the determining unit 4, the temporary housing unit 5, and the storage unit 6. Although it is described later in detail, the conveying-direction switching gate 10 has a plurality of blades coaxially attached to the shaft so that the direction of the blades is switched in accordance with rotation of the shaft due to a driving mechanism (not illustrated) including a drive device such as a motor.

The conveying-direction switching gate 10 switches the conveying direction of the bill 2 on the conveyance path 7*a* by guiding it with the blades so that it is wound around and housed in the temporary housing unit 5. Furthermore, the conveying-direction switching gate 10 switches the direction of the blades in accordance with rotation of the shaft, guides the bill 2 that is unwound from the temporary housing unit 5, and feeds it to the conveyance path 7*a*. Moreover, the conveying-direction switching gate 10 switches the direction of the blades in accordance with rotation of the shaft and conveys the bill 2 on the conveyance path 7*a* to the storage unit 6 without storing it in the temporary housing unit 5.

Furthermore, the bill handling device 1 includes a control unit 8 that controls each of the money receiving/drawing unit 3, the determining unit 4, the temporary housing unit 5, the storage unit 6, and the conveying mechanism 7.

Conveying-Direction Switch Gate

Figure 4:
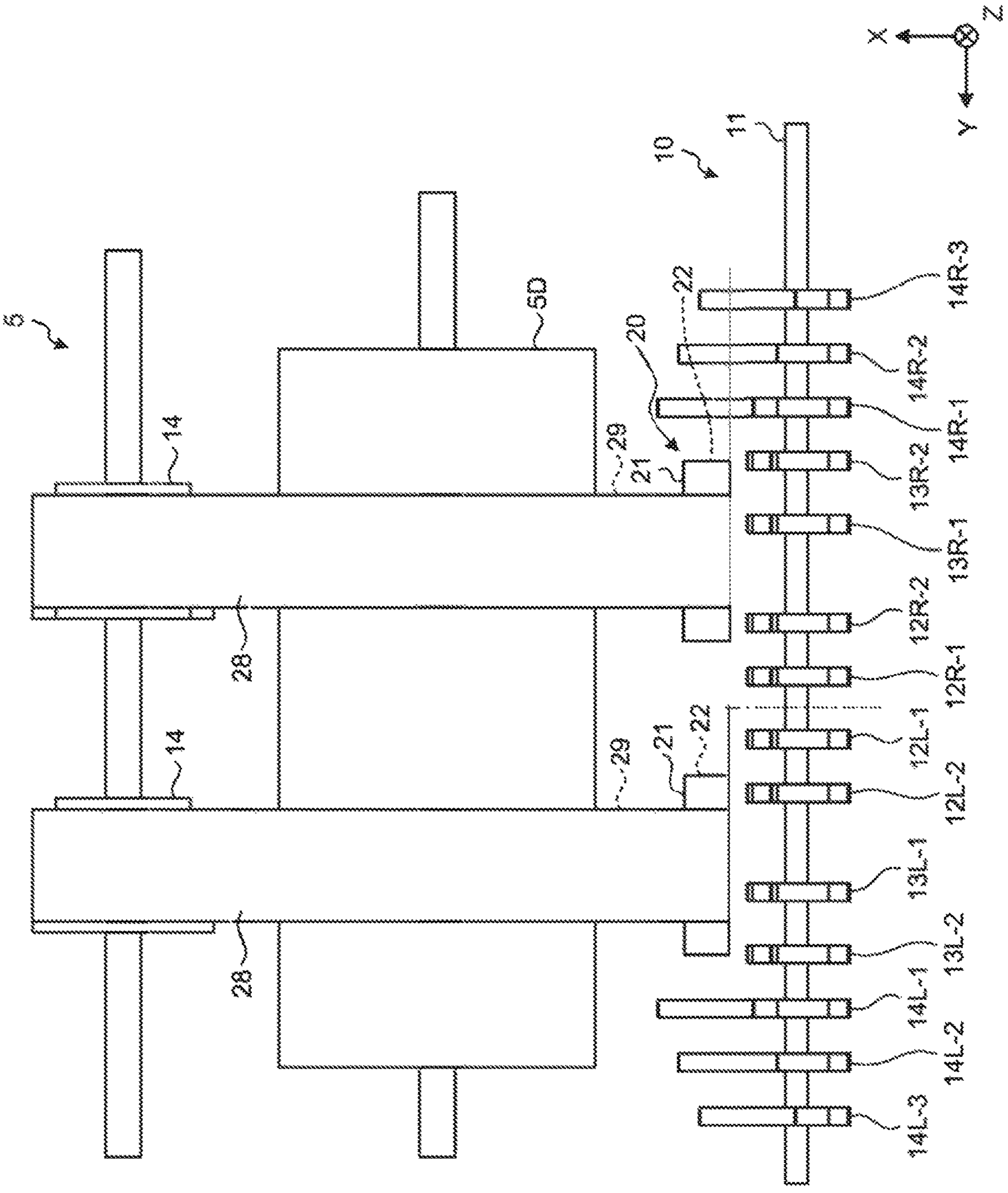
FIG. 4 is a plan view that illustrates the conveying-direction switching gate and the relevant part of a temporary housing unit according to the embodiment.
Figure 5:
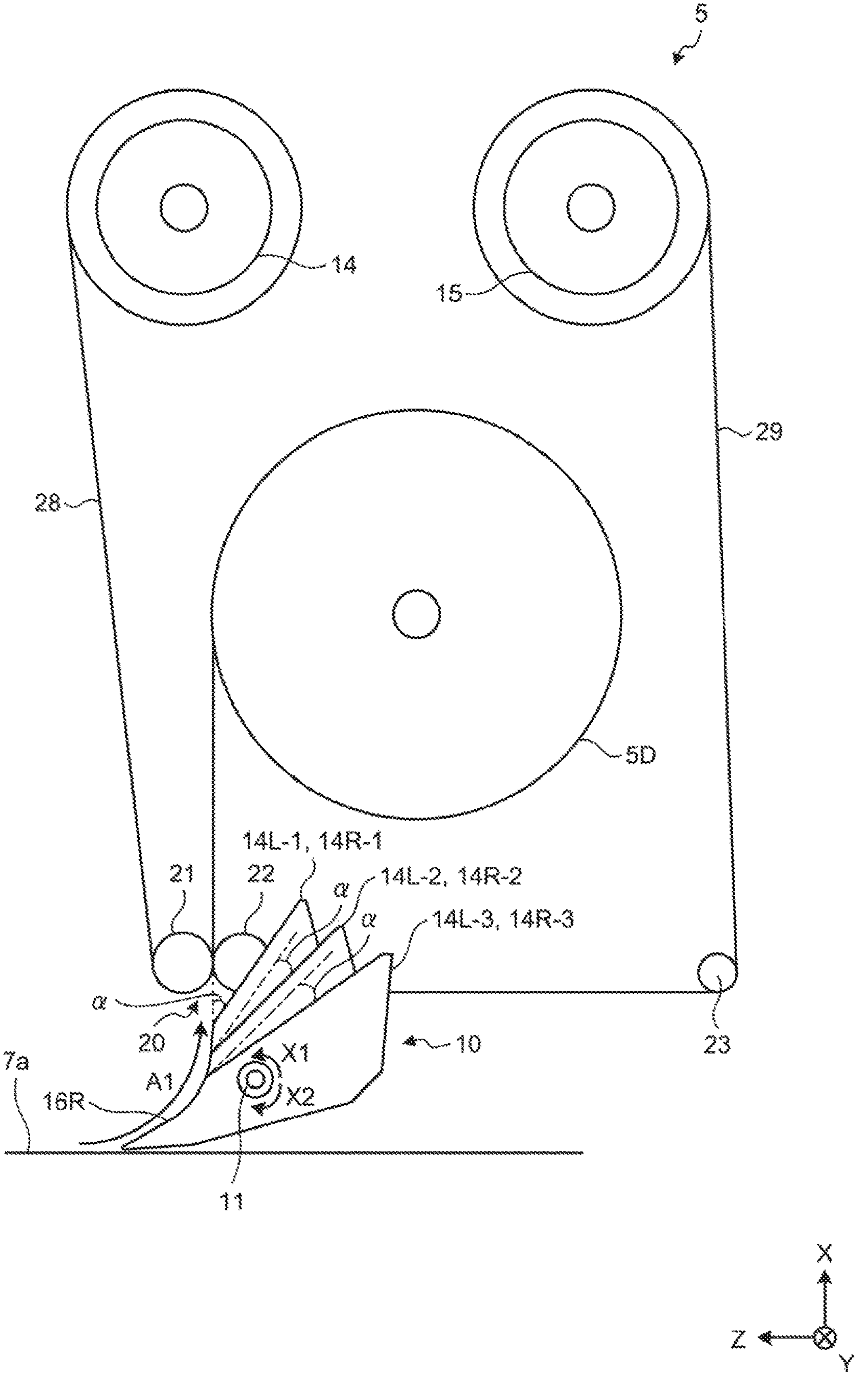
FIG. 5 is a side view that illustrates the conveying-direction switching gate and the relevant part of the temporary housing unit according to the embodiment.

FIG. 2 is a perspective view that illustrates the conveying-direction switching gate according to the embodiment 3 is a plan view that illustrates the conveying-direction switching gate according to the embodiment and is a view of two sides thereof. FIG. 4 is a plan view that illustrates the conveying-direction switching gate and the relevant part of the temporary housing unit according to the embodiment. FIG. 5 is a side view that illustrates the conveying-direction switching gate and the relevant part of the temporary housing unit according to the embodiment.

The conveying-direction switching gate 10 includes blades 12L-1, 12L-2, 13L-1, 13L-2, 14L-1 to 14L-3, 12R-1, 12R-2, 13R-1, 13R-2, 14R-1 to 14R-3 that are pivotally supported by the shaft 11. In the conveying-direction switching gate 10, the position and the shape of the blades are symmetric with the middle between the blade 12L-1 and the blade 12R-1 as a boundary.

The shaft 11 is rotated by a driving mechanism (not illustrated) including a drive device such as a motor. In accordance with rotation, the angle of the blades 12L-1 to 14R-3 relative to the conveyance path 7*a* is changed. For example, the driving mechanism rotates the shaft 11 in a direction X1 (see FIG. 2, FIG. 3, and FIG. 5) to switch the conveying direction of the bill 2 on the conveyance path 7*a* and forms a conveyance route for the bill 2 between the conveyance path 7*a* and the temporary housing unit 5. Furthermore, the driving mechanism rotates the shaft 11 in a direction X2 (see FIG. 2, FIG. 3, and FIG. 5) so that the bill 2 on the conveyance path 7*a* passes through the temporary housing unit 5 and reaches the storage unit 6.

With Regard to the Blades

Figure 3:
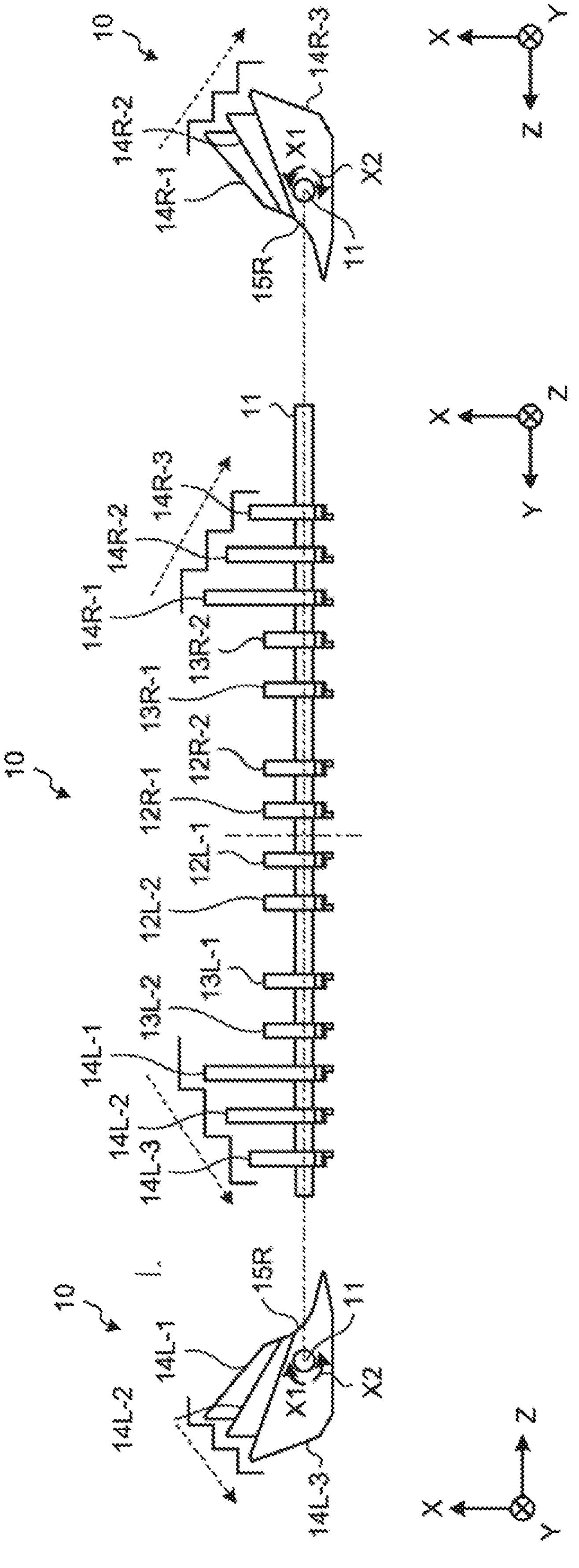
FIG. 3 is a plan view that illustrates the conveying-direction switching gate according to the embodiment and is a view of two sides thereof.

As illustrated in the plan view in the middle of FIG. 3 and FIG. 4, in the conveying-direction switching gate 10, the blades 12L-1 to 13R-2 have substantially the same height in a positive direction of the X axis when viewed in a vertical direction (a positive direction of the Z axis) with respect to the conveying direction of the bill 2 on the conveyance path 7*a*.

Furthermore, as illustrated in FIG. 3 (the front view and the right-and-left side views) and FIG. 4, the conveying-direction switching gate 10 is formed such that the heights of the blades in the positive direction of the X axis are gradually shorter by a certain degree in order of the blades 14L-1, 14L-2, and 14L-3 as they are located from the inner side toward the outer side (a positive direction of the Y axis) when viewed in a vertical direction (a positive direction of the Z axis) with respect to the conveying direction of the bill 2 on the conveyance path 7*a*. In the same manner, the conveying-direction switching gate 10 is formed such that the heights of the blades in the positive direction of the X axis are gradually shorter in order of the blades 14R-1, 14R-2, and 14R-3 as they are located toward a negative direction of the Y axis when viewed in the positive direction of the Z axis.

Furthermore, as illustrated in the left side view of FIG. 3, the conveying-direction switching gate 10 is formed such that the distance from the shaft 11 to the front edge of a blade in a negative direction of the Z axis is gradually increased in order of the blade 14L-1, 14L-2, and 14L-3, when viewed in a lateral direction (a positive direction of the Y axis) with respect to the conveying direction of the bill 2 on the conveyance path 7*a*. In the same manner, as illustrated in the right side view of FIG. 3, the conveying-direction switching gate 10 is formed such that the distance from the shaft 11 to the front edge of a blade in a negative direction of the Z axis is gradually increased in order of the blade 14R-1, 14R-2, and 14R-3, when viewed in a negative direction of the Y axis.

Specifically, as illustrated in FIG. 5, the side of each of the blades 14L-1, 14L-2, and 14L-3 located at the highest position in the positive direction of the X axis is formed such that the blade 14L-1 makes a predetermined angle α with the direction (i.e., the positive direction of the X axis) in which the bill 2 is delivered to or discharged from the delivering/discharging section. 20, the blade 14L-2 makes the predetermined angle α with the blade 14L-1, and the blade 14L-3 makes the predetermined angle α with the blade 14L-2. In the same manner, the side of each of the blades 14R-1, 14R-2, and 14R-3 located at the highest position in the positive direction of the X axis is formed such that the blade 14R-1 makes the predetermined angle α with the direction (i.e., the positive direction of the X axis) in which the bill 2 is delivered to or discharged from the delivering/discharging section 20, the blade 14R-2 makes the predetermined angle α with the blade 14R-1, and the blade 14R-3 makes the predetermined angle α with the blade 14R-2.

Furthermore, as illustrated in the front view of FIG. 3 and FIG. 4, the height of the blades 12L-1 to 13R-2 in the positive direction of the X axis is shorter than that of the blades 14L-1 to 14R-3. Therefore, as illustrated in FIG. 4, the conveying-direction switching gate 10 is arranged such that the parts of the blades 12L-1 to 13R-2 are located close to the delivering/discharging section 20 including the pulleys 21, 22 and the blades 14L-1 to 14R-3 extend close to the drum 5D beyond the pulleys 21, 22. As the parts of the blades 12L-1 to 13R-2 in the conveying-direction switching gate 10 are installed close to the delivering/discharging section 20, it is possible to conserve spaces in the bill handling device 1 and increase the amount of the bills 2 housed in the temporary housing unit 5.

Furthermore, as illustrated in the right and left side views of FIG. 3 and FIG. 5, each of the blades 12L-1 to 14R-3 including the blades 14L-1 to 14L-3 includes a curved-line guide portion 16R on the side in a negative direction of the X axis from the shaft 11. As illustrated in FIG. 5, the curved-line guide portion 16R is formed so as to guide the bill 2 until the bill 2 becomes substantially vertical to the delivering/discharging section 20 (i.e., substantially parallel to the Z axis) while the bill 2 is moved through the curved-line guide portion 16R along an arrow A1 when the bill 2 is received, i.e., when the bill 2 is wound around the drum 5D. Thus, the curved-line guide portion 16R may prevent the occurrence of lams such that the turned-down end portion of the bill 2 is hit by for example the tape 29 between the pulleys 22, 23 when the bill 2 is wound around the drum 5D.

Here, the conveying-direction switching gate 10 is an example of the conveying-direction switching device. Furthermore, the blades 12L-1, 12L-2, 13L-1, 13L-2, 12R-1, 12R-2, 13R-1, and 13R-2 are an example of a first blade group. Furthermore, the blades 14L-1 to 14L-3 and 14R-1 to 14R-3 are an example of a second blade group. The number of the blades 12L-1 to 14R-3 according to the present embodiment is only an example. Moreover, the number of the blades 12L-1, 12L-2, 13L-1, 13L-2, 12R-1, 12R-2, 13R-1, and 13R-2, which are the first blade group, and the number of the blades 14L-1 to 14L-3 and 14R-1 to 14R-3, which are blades in the second blade group, are only an example.

With Regard to the Tape

According to the present embodiment, the tapes 28, 29, which are resin films, are used as an example of the belt-like member; however, tapes made of a different material or belt-like members other than tapes may be used as needed. Furthermore, according to the present embodiment, upper tapes are the two tapes 28, lower tapes are the two tapes 29, and the bill 2 is sandwiched between the upper tapes and the lower tapes in a vertical direction and is wound around the drum 5D; however, this is not a limitation. For example, the upper tapes and the lower tapes may be one tape or three or more tapes. Furthermore, the bill 2 does not need to be sandwiched between the upper tape and the lower tape in a vertical direction and wound around the drum 5D, and for example the bill 2 may be pressed onto the drum outer circumference of the drum 5D with only the upper tape to be wound around the drum 5D.

With Regard to the Drum

Furthermore, according to the present embodiment, the drum 5D illustrated in FIG. 4, FIG. 5, FIG. 2, and the like, is for example a drum continuously formed in a direction (the Y-axis direction) of the shaft 11; however, this configuration is not a limitation, and it may be a pair of drums that are separated in the Y-axis direction.

Correction on the Attitude of the Bill

With reference to FIG. 6A to FIG. 9B, an explanation is given below of correction on the attitude of the bill whose ends are turned down when it is delivered. FIG. 6A, FIG. 7A, FIG. 8A, and FIG. 9A are side views that illustrate a first stage, a second stage, a third stage, and a fourth stage for correcting the attitude of the bill whose ends are turned down when it is delivered by the conveying-direction switching gate according to the embodiment. FIG. 6B, FIG. 7B, FIG. 8B, and FIG. 9B are perspective views that illustrate states at the first stage, the second stage, the third stage, and the fourth stage for correcting the attitude of the bill whose ends are turned down when it is delivered by the conveying-direction switching gate according to the embodiment, when viewed in a direction A2 in FIG. 6A to FIG. 9A.

Figure 6A:
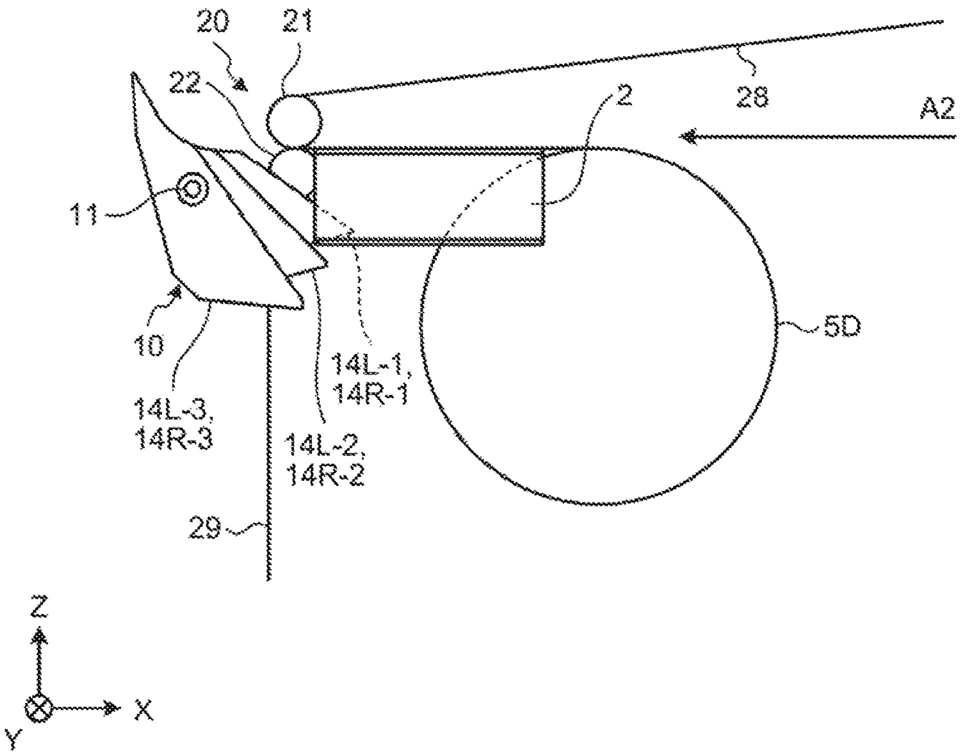
FIG. 6A is a side view that illustrates a first stage for correcting the attitude of the bill whose ends are turned down when it is delivered by the conveying-direction switching gate according to the embodiment.
Figure 6B:
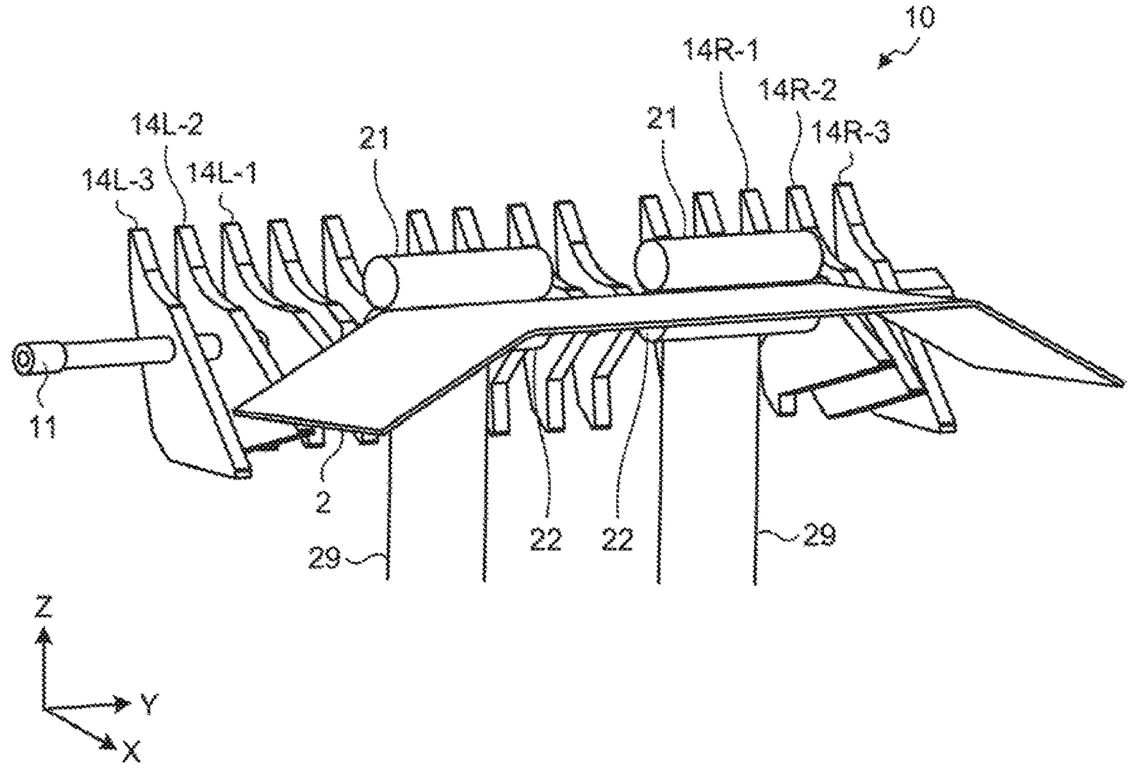
FIG. 6B is a perspective view that illustrates the first stage for correcting the attitude of the bill whose ends are turned down when it is delivered by the conveying-direction switching gate according to the embodiment.

First, as illustrated in FIG. 6A and FIG. 6B, in the first stage, the bill 2 sandwiched between the tapes 28, 29 and wound around the drum 5D is unwound and is delivered to the neighborhood of the delivering/discharging section 20 including the pulleys 21, 22. When the bill 2 comes close to the delivering/discharging section 20, the blades 14L-1, 14R-1, which are closest to the tapes 28, 29 among the blades 14L-1 to 14R-3, correct the states of the turned-down ends, starting from the sides close to the tapes 28, 29.

Here, the heights of the blades 14L-2 to 14R-3 are gradually shorter in the positive direction of the X axis as compared with the blades 14L-1, 14R-1. Therefore, in the first stage, the blades 14L-2 to 14R-3 are not in contact with the bill 2 when the blades 14L-1, 14R-1 correct the attitude of the bill 2, whereby the blades 14L-1, 14R-1 may correct the attitude of the bill 2 in a smooth manner.

Furthermore, with regard to the blades 14L-2 to 14R-3, the distance from the shaft 11 to the front edge of the blade in the negative direction of the Z axis is gradually longer as compared with the blades 14L-1, 14R-1. Therefore, in the first stage, as illustrated in FIG. 6A and FIG. 6B, the end portions of the blades 14L-2, 14R-2 are in contact with or is close to the part of the bill 2 that is turned down so that a standby state is set to correct the attitude with the bade; 14L-2, 14R-2, whereby the blades 14L-2, 14R-2 may correct the attitude in a smooth manner in the second and subsequent stages.

Here, at the first stage in FIG. 6A, the blades 14L-2, 14R-2 are in contact with or are close to the parts of the bill 2 that are turned down so that a standby state is set to correct the attitude; however, in some cases, due to a degree of the bill 2 that is turned down or the position of the bill 2, the blades 14L-3, 14R-3 are in contact with or are close to the parts of the bill 2 that are turned down so that a standby state is set to correct the attitude.

Figure 7A:
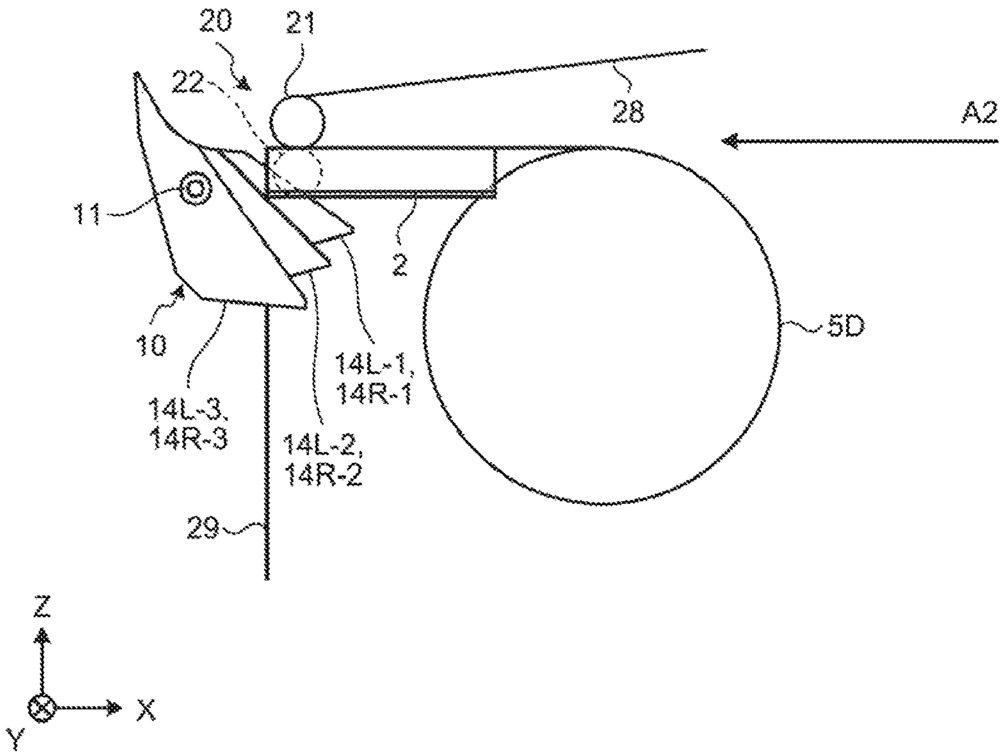
FIG. 7A is a side view that illustrates a second stage for correcting the attitude of the bill whose ends are turned down when it is delivered by the conveying-direction switching gate according to the embodiment.
Figure 7B:
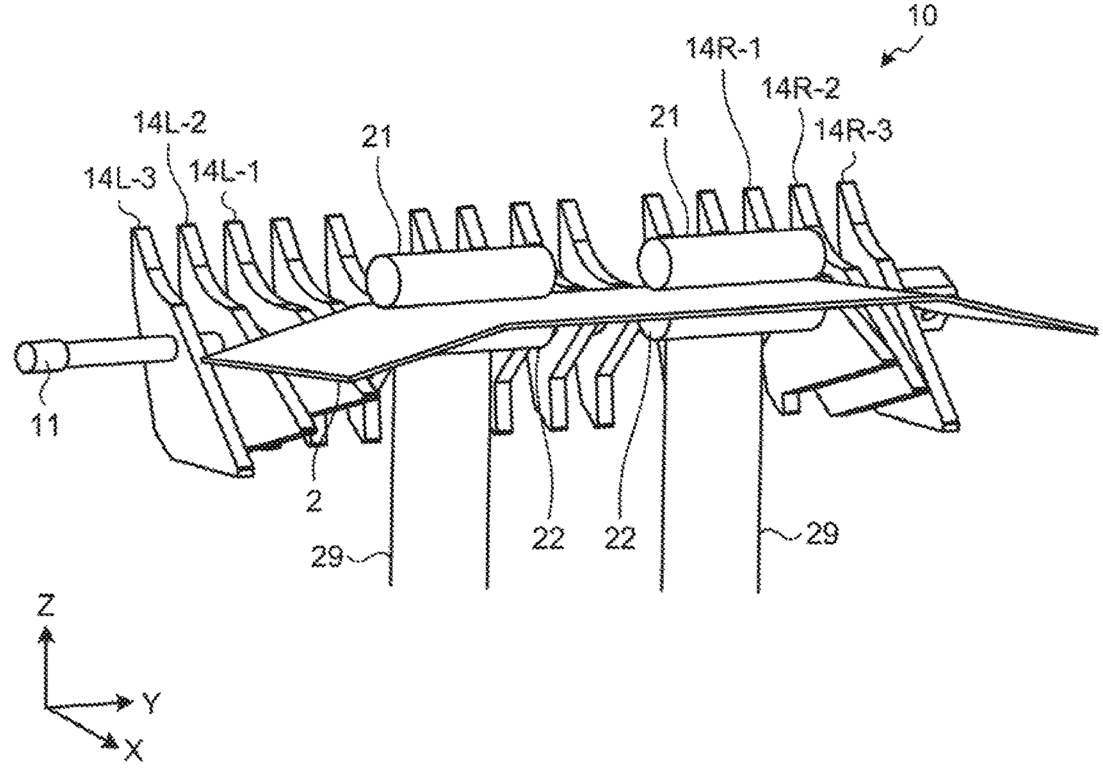
FIG. 7B is a perspective view that illustrates the second stage for correcting the attitude of the bill whose ends are turned down when it is delivered by the conveying-direction switching gate according to the embodiment.

Next, in the second stage as illustrated in FIG. 7A and FIG. 7B, after the turned-down state of the ends of the bill 2 have been corrected in the first stage and has been further unwound to reach the delivering/discharging section 20, the turned-down state of the bill 2, which has not been corrected yet in the first stage, is corrected by the blades 14L-2, 14R-2 that are closest to the tapes 28, 29 besides the blades 14L-1, 14R-1 among the blades 14L-1 to 14R-3.

Here, the heights of the blades 14L-3, 14R-3 in the positive direction of the X axis are shorter than those of the blades 14L-2, 14R-2. Therefore, in the second stage, the blades 14L-3, 14R-3 are not in contact with the bill 2 when the blades 14L-2, 14R-2 correct the attitude of the bill 2, whereby the blades 14L-2, 14R-2 may correct the attitude of the bill 2 in a smooth manner.

Figure 8A:
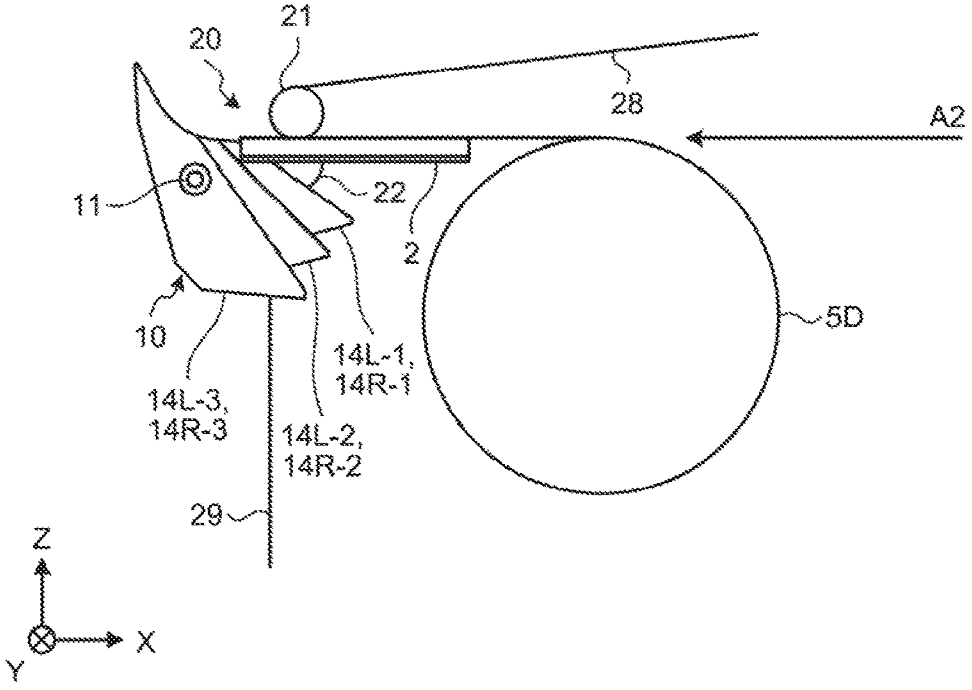
FIG. 8A is a side view that illustrates a third stage for correcting the attitude of the bill whose ends are turned down when it is delivered by the conveying-direction switching gate according to the embodiment.
Figure 8B:
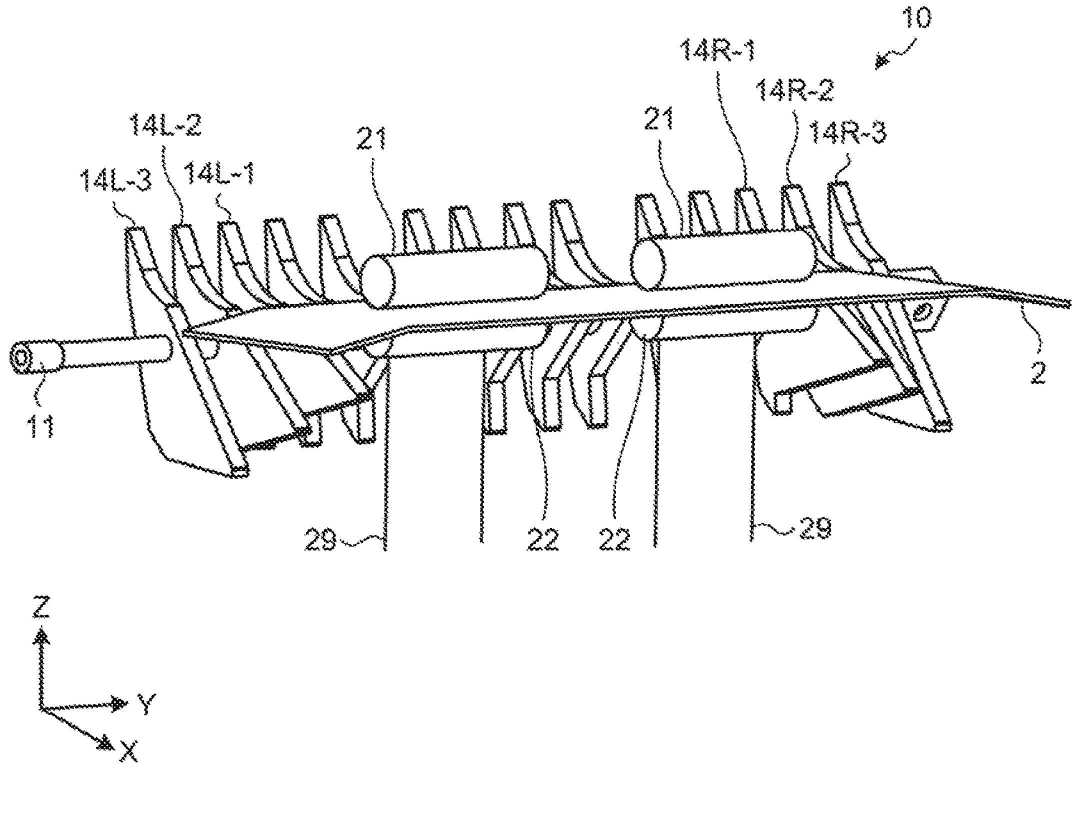
FIG. 8B is a perspective view that illustrates the third stage for correcting the attitude of the bill whose ends are turned down when it is delivered by the conveying-direction switching gate according to the embodiment.

Then, as illustrated in FIG. 8A and FIG. 8B, after the states of the turned-down ends of the bill 2 have been corrected in the second stage and has been further unwound to be delivered from the delivering/discharging section 20, the turned-down state of the bill 2, which has not been corrected in the second stage, is further corrected by the blades 14L-2, 14R-2 in the third stage.

Here, the heights of the blades 14L-3, 14R-3 in the positive direction of the X axis are shorter than those of the blades 14L-2, 14R-2. Therefore, in the third stage, the blades 14L-3, 14R-3 are not in contact with the bill 2 when the blades 14L-2, 14R-2 correct the attitude of the bill 2, whereby the blades 14L-2, 14R-2 may correct the attitude of the bill 2 in a smooth manner.

Figure 9A:
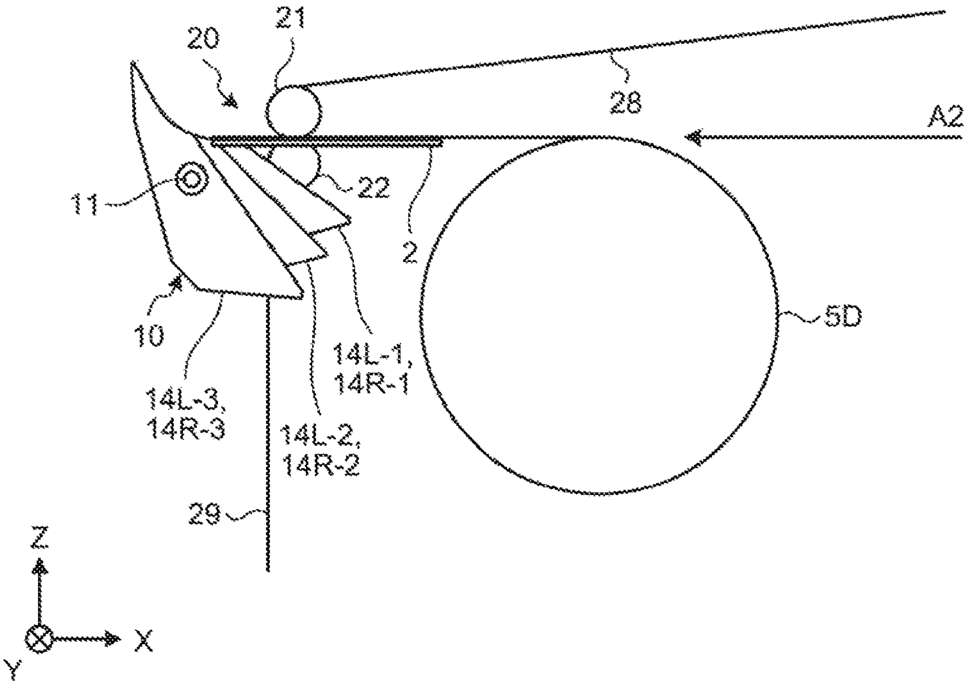
FIG. 9A is a side view that illustrates a fourth stage for correcting the attitude of the bill whose ends are turned down when it is delivered by the conveying-direction switching gate according to the embodiment.
Figure 9B:
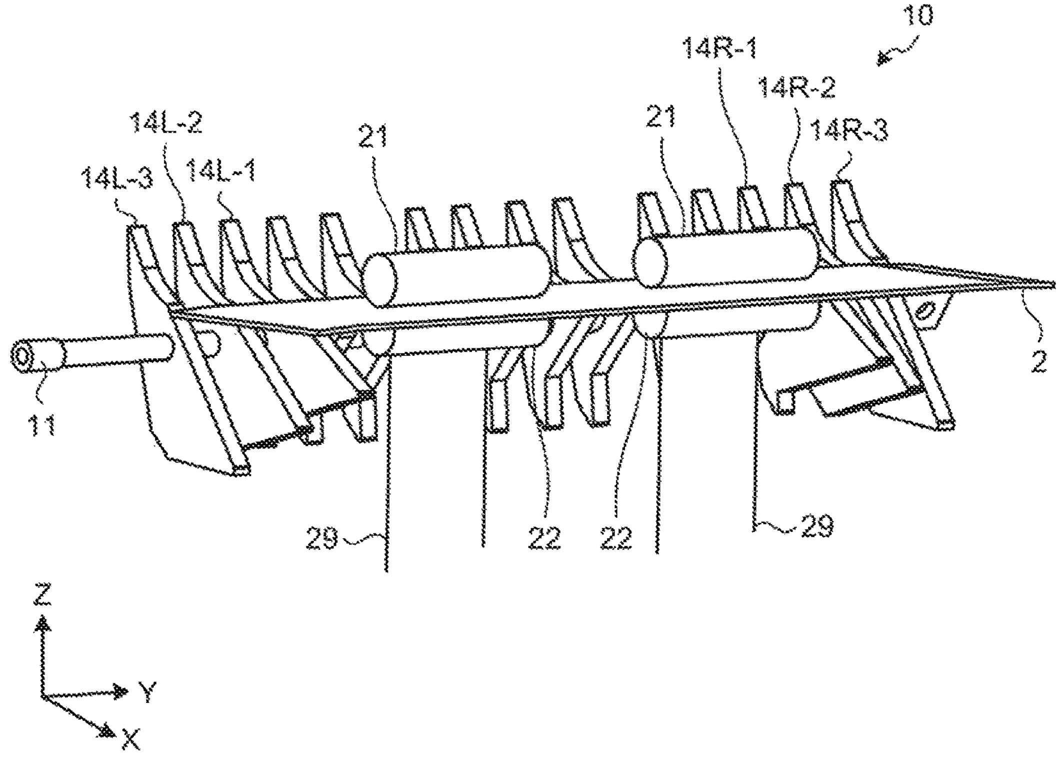
FIG. 9B is a perspective view that illustrates the fourth stage for correcting the attitude of the bill whose ends are turned down when it is delivered by the conveying-direction switching gate according to the embodiment.

Finally, as illustrated in FIG. 9A and FIG. 9B, after the turned-down states of the ends of the bill 2 have been corrected in the third stage and has been further unwound to be further delivered from the delivering/discharging section 20, the turned-down states have been substantially corrected by the blades 14L-2, 14R-2 so that the bill 2 is in substantially a flat state in the fourth stage. After the bill 2 has become a flat state, it is smoothly delivered from the temporary housing unit 5 to the conveyance path 7*a* through the delivering/discharging section 20.

As illustrated above in the first stage to the fourth stage, when the bill 2 is delivered, the blades sequentially become functional, starting from the one at the center side of the shaft 11, such that the attitude of the bill 2 is first corrected with the blade at the center side of the shaft 11 and the next blade on the outer side enters a stand-by state to correct the attitude of the bill 2; thus, the bill 2 may be smoothly controlled to be a flat state.

According to the above embodiment, the conveying-direction switching gate 10 switches the conveying direction of the bill 2 conveyed through the conveyance path 7*a* and also keeps the attitude of the bill 2 in a flat state when the bill 2 is moved between the temporary housing unit 5 and the conveyance path 7*a*; therefore, an intermediate conveyance path does not need to be provided between the temporary housing unit 5 and the conveyance path 7*a*. For this reason, the size of the chassis of the bill handling device 1 may be reduced when the amount of the bills 2 contained in the temporary housing unit 5 is the same amount. Furthermore, the amount of the bills 2 contained in the temporary housing unit 5 may be increased when the size of the chassis of the bill handling device 1 is the same size. Furthermore, there may be a reduction in costs due to a decreased number of components. Moreover, the conveying-direction switching gate 10 may control or correct the attitude of the bill 2 that is turned down.

Modification

Shape of the Blade

According to the above embodiment, in the conveying-direction switching gate 10, as illustrated in for example FIG. 3 and FIG. 4, the heights of the blades 12L-1 to 12R-2 in the positive direction of the X axis are identical when viewed in a vertical direction (the negative direction of the Z axis) with respect to the conveying direction of the bill 2 on the conveyance path 7*a*. However, when the temporary housing unit 5 includes multiple pairs of the tapes 28, 29 (in the example illustrated in FIG. 3 and FIG. 4, two pairs of tapes where the upper and lower tapes 28, 29 are one pair) as in the embodiment, a conveying-direction switching gate 10A according to a modification may include blades 12L-3 to 12R-4 as blades arranged between the pairs of the tapes 28, 29 (i.e., the position opposed to the delivering/discharging section 20) instead of the blades 12L-1 to 12R-2 in the conveying-direction switching gate 10, as illustrated in FIG. 10.

Specifically, the blades 12L-3, 12L-4 are formed such that their heights in the positive direction of the X axis gradually become shorter in order from the blade 12L-4 to 12L-5 toward the tapes 28, 29 (the positive direction of the X axis). Similarly, the blades 12R-3, 12R-4 are formed such that their heights in the positive direction of the X axis gradually become shorter in order from the blade 12R-4 to 12R-3 toward the positive direction of the X axis.

With this configuration of the blades arranged at the position opposed to the delivering/discharging section 20, the attitude of the bill 2 may be corrected and delivered to the temporary housing unit 5 in the same manner as the blades 14L-1 to 14R-3 even when the bill 2, which is to be delivered to the temporary housing unit 5, is inclined in the Y-axis direction and the turned-down end portion of the bill 2 is located between the pairs of the tapes 28, 29.

Figure 10:
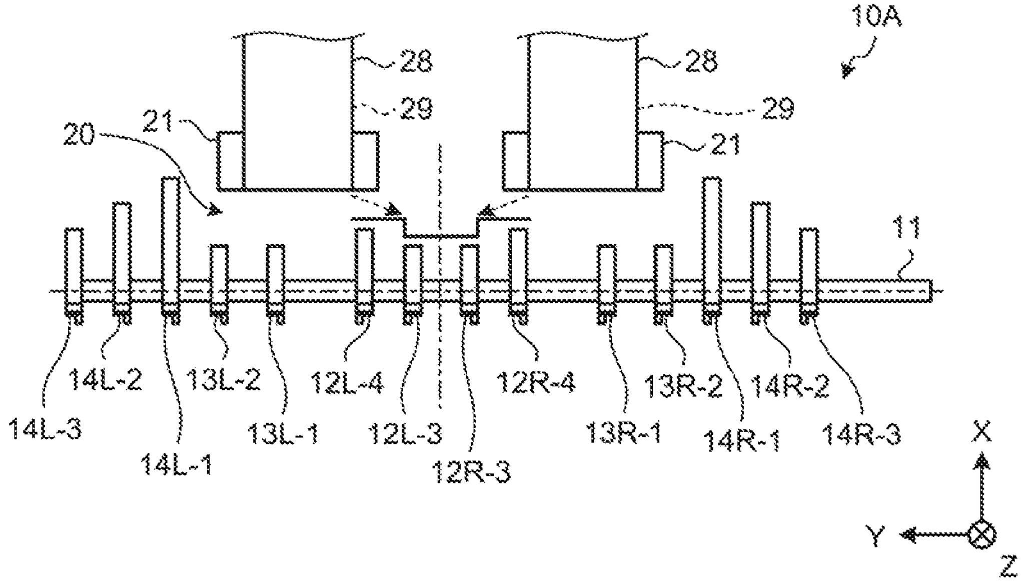
FIG. 10 is a plan view that illustrates the conveying-direction switching gate according to a modification.
Figure 11:
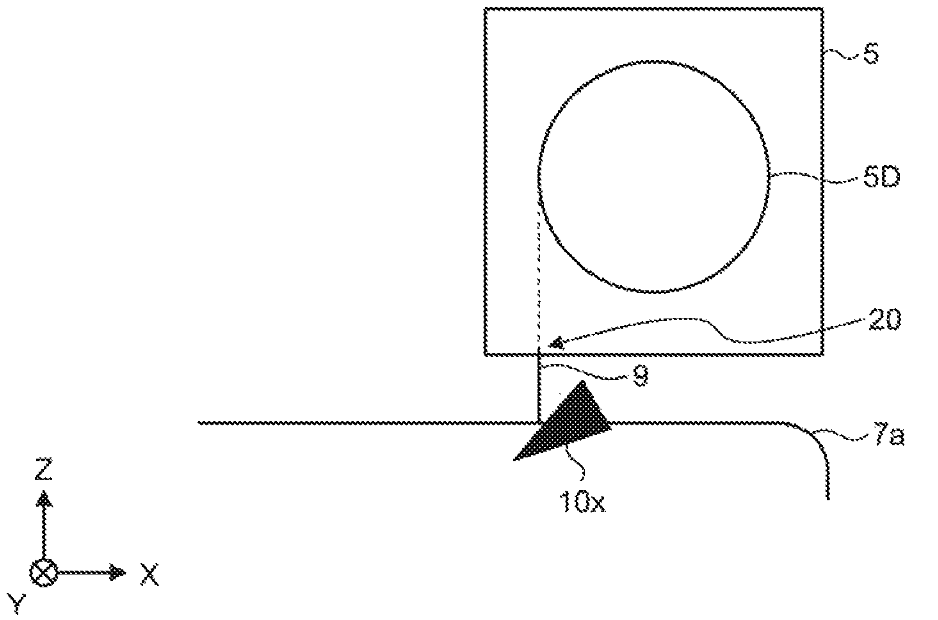
FIG. 11 is a schematic view of a temporary housing unit, a switching mechanism, and an intermediate conveyance path according to a related technology when viewed in a lateral direction.

Here, FIG. 10 illustrates a case where the two pairs of tapes, the upper and lower tapes 28, 29 in one pair, are provided; however, when three or more pairs of tapes are provided, blades having the same shapes as those of the blades 12L-3 to 12R-4 may be arranged in each gap between the pairs of tapes. Furthermore, the blades 12L-3, 12L-4 may be formed such that their heights in the positive direction of the Z axis gradually become shorter in order from the blade 12L-4 to 12L-3 and the blades 12R-3, 12R-4 may be formed such that their heights in the positive direction of the Z axis gradually become shorter in order from the blade 12R-4 to 12R-3 when viewed in the lateral direction (the Y-axis direction) with respect to the conveying direction of the bill 2.

The Temporary Housing Unit Including the Conveying-Direction Switching Gate

According to the above embodiment, the conveying-direction switching gate 10 is located between the temporary housing unit 5 and the conveyance path 7*a*; however, a configuration may be such that the temporary housing unit 5 includes the conveying-direction switching gate 10. That is, the conveying-direction switching gate 10 may be arranged for example on the side closer to the conveyance path 7*a* than the delivering/discharging section 20 in the temporary housing unit 5.

Continuous Formation of the Blades

According to the above embodiment, in the conveying-direction switching gate 10, the blades 12L-1 to 14R-3 are arranged discretely on the shaft 11. However, this is not a limitation, and in a conveying-direction switching gate, blades may be continuously formed on the shaft 11. Specifically, in the conveying-direction switching gate, blades may be continuously formed so as to have the shape with the same functionality as that of the conveying-direction switching gate 10.

Positional relationship among the conveyance path, the conveying-direction switching gate, and the temporary housing unit.

With the positional relationship according to the above embodiment, the conveying-direction switching gate 10 switches the conveying direction so that the bill 2 conveyed on the conveyance path 7*a* is delivered to the temporary housing unit 5 that is located above the conveyance path 7*a*. However, this is not a limitation on the positional relationship among the conveyance path 7*a*, the conveying-direction switching gate 10, and the temporary housing unit 5.

Example of Application According to the Embodiment

According to the above embodiment, the conveying-direction switching gate 10 switches the conveying direction of the bill 2 on the conveyance path 7*a* to house the bill 2 in the temporary housing unit 5. However, the conveying direction of the bill 2 on the conveyance path 7*a* may be switched to house the bill 2 in not only the temporary housing unit 5 but also various housing units using a winding mechanism, for example, a stacker.

According to an example of the disclosed technology, the amount of sheets housed in a temporary housing unit may be ensured without increasing the size of a chassis of for example a sheet handling device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conveying-direction switching device comprising:
- a shaft; and
- a plurality of blades that are pivotally supported by the shaft and that switch a conveying direction of a sheet conveyed through a conveyance path to a direction toward a delivering/discharging section for the sheet included in a housing unit that houses the sheet by winding the sheet around a drum together with a belt-like member, wherein
- the plurality of blades include:
  - a first blade group that is pivotally supported in a neighborhood of a center of the shaft and that is opposed to the delivering/discharging section; and
  - a second blade group that is pivotally supported on an outer side of the shaft as compared with the first blade group, and
  - each blade in the second blade group is formed such that a height in the direction, which is the direction that the drum exists, relative to the conveyance path is shorter as a pivotally supported position is located on an outer side of the shaft,
- wherein the plurality of blades switch the conveying direction and keep an attitude of the sheet in a flat state when the sheet is moved between the housing unit and the conveyance path.

2. The conveying-direction switching device according to claim 1, wherein each blade in the second blade group is formed such that a length in a direction of the conveyance path is longer as a pivotally supported position is located on an outer side of the shaft.

3. The conveying-direction switching device according to claim 2, wherein each blade in the second blade group is formed such that a predetermined side of a blade pivotally supported on a most central side of the shaft makes a predetermined angle with the direction and predetermined sides of adjacent blades make the predetermined angle with each other.

4. The conveying-direction switching device according to claim 1, wherein, in the first blade group that is opposed to the delivering/discharging section included in the housing unit that houses the sheet by winding the sheet around the drum together with the belt-like members that are parallel to each other, each blade in a blade group located in an interval between the adjacent belt-like members is formed such that a height in the direction relative to the conveyance path is shorter as the blade is located closer to a neighborhood of a center of the shaft around which the blade group is pivotally supported.

5. The conveying-direction switching device according to claim 1, wherein the plurality of blades further include a guide portion for guiding the sheet conveyed through the conveyance path until an attitude of the sheet is changed from the conveying direction to the direction when the conveying direction of the sheet is switched.

6. A sheet handling device comprising:
- a conveyance path through which a received sheet as currency is conveyed;
- a housing unit that houses the sheet delivered from a delivering/discharging section by winding the sheet around a drum together with a belt-like member that is folded at a fold section and that delivers the sheet wound around the drum from the delivering/discharging section; and
- a conveying-direction switching device that includes a plurality of blades that are pivotally supported by a shaft and that switch a conveying direction of the sheet conveyed through the conveyance path to a direction toward the delivering/discharging section, wherein
- the plurality of blades include:
  - a first blade group that is pivotally supported in a neighborhood of a center of the shaft and that is opposed to the delivering/discharging section, and
  - a second blade group that is pivotally supported on an outer side of the shaft as compared with the first blade group, and
  - each blade in the second blade group is formed such that a height in the direction, which is the direction that the drum exists, relative to the conveyance path is shorter as a pivotally supported position is located on an outer side of the shaft,
- wherein the plurality of blades switch the conveying direction and keep an attitude of the sheet in a flat slate when the sheet is moved between the housing unit and the conveyance path.

* * * * *